UNITED STATES PATENT OFFICE.

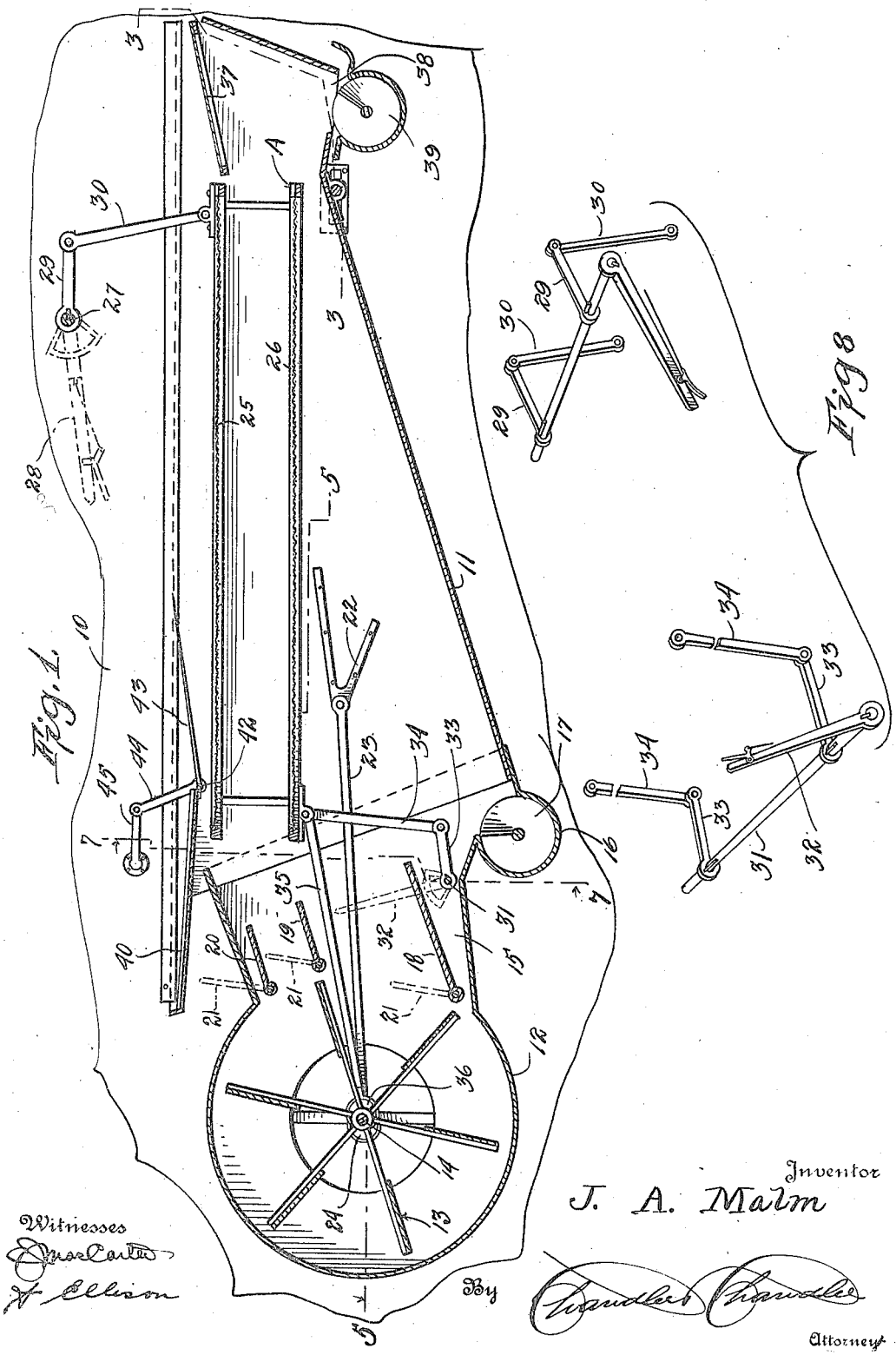

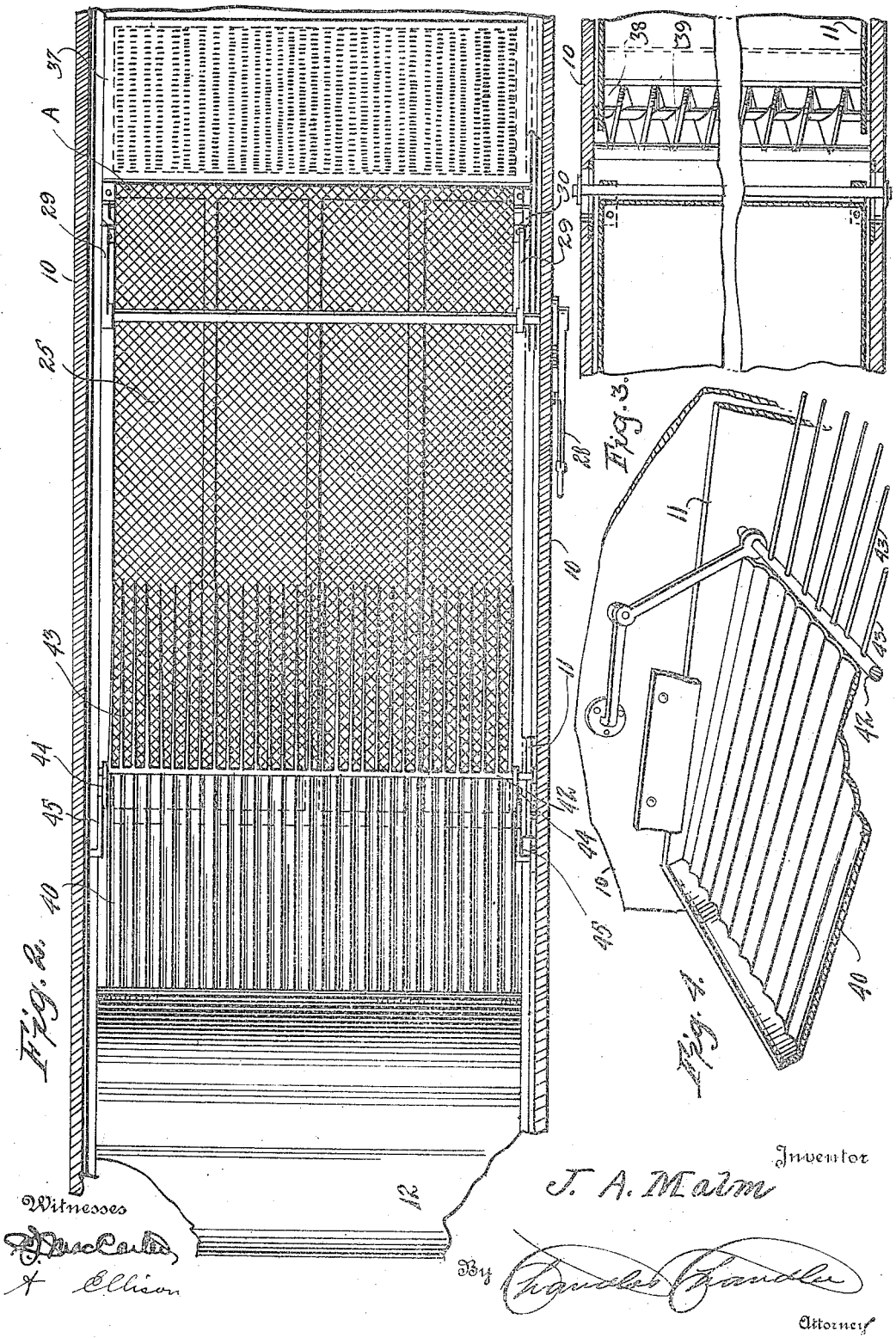

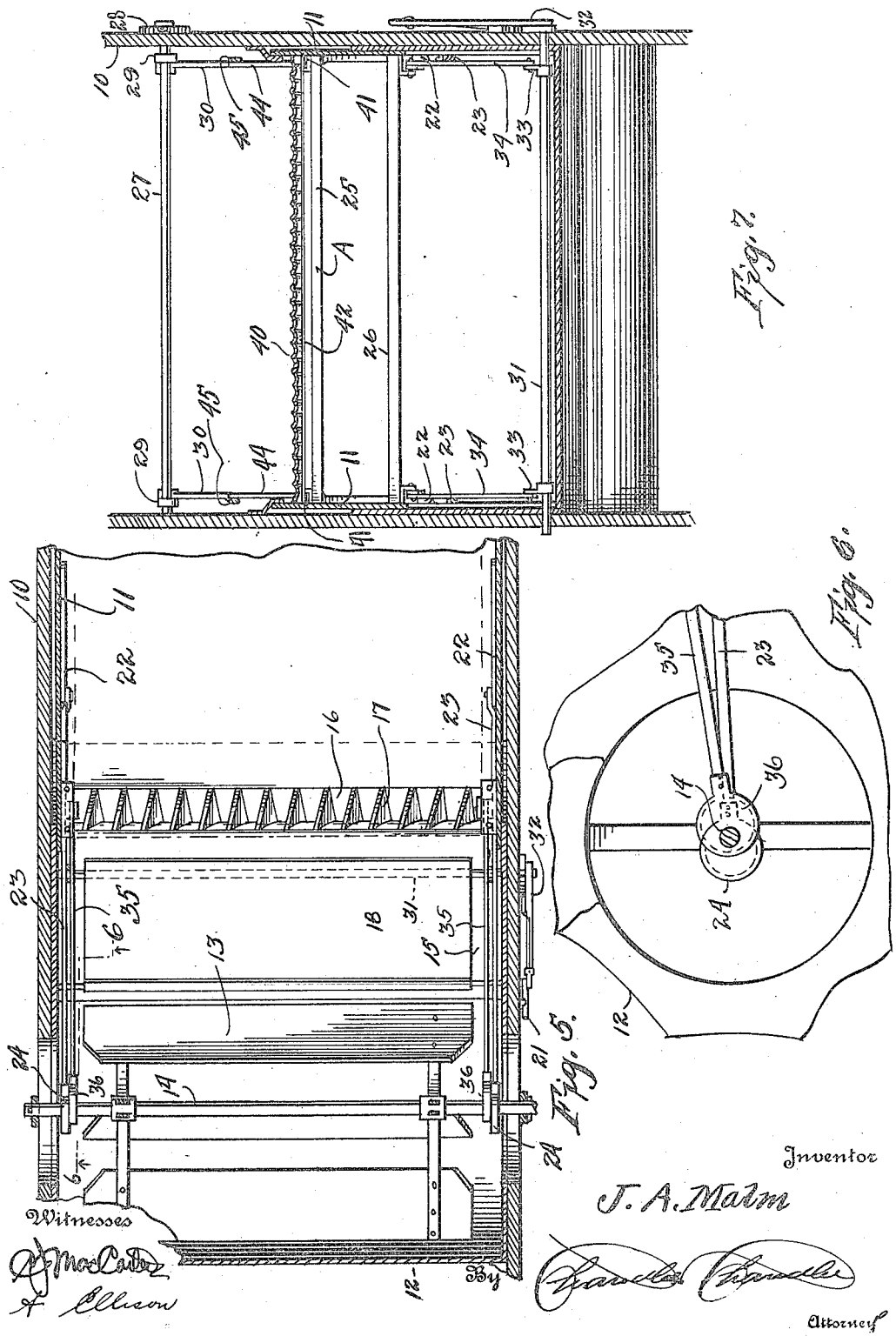

JOHN A. MALM, OF DIAMOND, SOUTH DAKOTA.

SCREENING MECHANISM FOR THRESHING-MACHINES.

1,232,947.  Specification of Letters Patent.  Patented July 10, 1917.

Application filed April 11, 1916. Serial No. 90,490.

*To all whom it may concern:*

Be it known that I, JOHN A. MALM, a citizen of the United States, residing at Diamond, in the county of Roberts, State of South Dakota, have invented certain new and useful Improvements in Screening Mechanism for Threshing-Machines; and I do hereby declare the following to be a full, clear, and exact description of the invention, such as will enable others skilled in the art to which it appertains to make and use the same.

This invention relates to screening mechanism for threshing machines.

The object of the invention is to provide a screening mechanism for threshing machines wherein the sieves are constructed independently of the shoes so that the sieves can be adjusted up or down at either end, means being provided for effecting such adjustment such means being operable while the mechanism is in operation.

A further object of the invention is to provide a plurality of wind boards between the fan casing and the sieve which are independently operable so that the wind can be substantially shut off from the sieves or all directed under the sieves, or in the center or on top, such a range of adjustment enabling the operator to regulate the wind to suit the particular kind of grain being threshed.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a vertical longitudinal section of a screening mechanism constructed in accordance with the invention;

Fig. 2, a plan view of what is shown in Fig. 1;

Fig. 3, a section on the line 3—3 of Fig. 1;

Fig. 4, a fragmental perspective view of the corrugated delivery pan of the shoe;

Fig. 5, a section on the line 5—5 of Fig. 1;

Fig. 6, a section on the line 6—6 of Fig. 5;

Fig. 7, a section on the line 7—7 of Fig. 1, and

Fig. 8, a detail perspective view of the lever connections for adjusting the front and rear ends of the sieves.

Referring to the drawings 10 indicates the body of the threshing machine in which is slidably mounted a shoe 11. Fixed within the body 10 is a fan casing 12 wherein is rotatably mounted a fan 13 including a fan shaft 14. This casing 12 is provided with a mouth 15 communicating with the interior of the shoe 11. The wall of the mouth 15 includes a substantially cylindrical portion 16 in which is mounted a grain auger 17 to which the grain is delivered from the shoe 11 in the usual manner. The mouth 15 is controlled by a plurality of pivoted wind boards 18, 19 and 20 adapted to be operated respectively through the medium of handles 21 on the exterior of the machine. Each side of the shoe 11 carries a bracket 22 to which is pivoted one end of an eccentric arm 23, the latter being operatively engaged on an eccentric 24 fixed on the shaft 14 and whereby the rotation of said shaft will reciprocate the shoe 11. Disposed within the shoe 11 is a sieve frame A carrying upper and lower sieves 25 and 26 respectively. Rotatably mounted between the sides of the body 10 is a shaft 27 having fixed on one end thereof exteriorly of the machine a lever 28 for effecting rotation of the shaft. Fixed on this shaft within the body 10 are arms 29 and the free ends of these arms are connected respectively with the adjacent end of the frame A by means of links 30, the links 30 in this instance being connected to the upper sieve 25. Also rotatably mounted between the sides of the body 10 is a shaft 31 having fixed on one end thereof exteriorly of the body 10 a lever 32 for effecting rotation of the shaft. Fixed on this shaft within the body 10 are arms 33 and the free ends of these arms are connected respectively to the adjacent end of the frame A by means of links 34, said links in this instance being connected to the lower sieve 26. The frame A has pivotally connected thereto one end of an eccentric arm 35 which is operatively engaged on an eccentric 36 fixed on the shaft 14. It will be noted that the eccentrics 24 and 36 are arranged oppositely so that during rotation of the shaft 14 the shoe 11 and the frame A will reciprocate in opposite directions. The shoe 11 carries at its forward end forward of the frame A a tailings chaffer 37 which is adapted to deliver through the opening 38 in the shoe 11 to a tailings auger 39. The shoe 11 carries rigid therewith a corrugated delivery pan 40 which is adapted to receive the grain from the grain pan. By corrugating this pan 40 it will deliver the grain evenly to the sieve 25 irrespective of whether the machine is set level or not. Rotatably mounted between the sides of the shoe 11 and in suitable bearings 41 carried by the pan 40 is a shaft 42 having fixed thereon a plurality of fingers 43 extending over the sieve 25. Also fixed on the shaft 42 is an arm 44 the free end of which is pivoted to the free end of an arm 45 and the latter is in turn pivoted to one of the side walls of the body 10. By this construction it will be obvious that as the shoe 11 is reciprocated the fingers 43 will vibrate up and down and shake up the sheet of chaff and grain when it comes from the grain pan.

What is claimed is:—

In a screening mechanism for threshing machines the combination of a body, a shoe having slidable engagement with the body, a sieve frame movable independent of the shoe and supported in the latter for reciprocation, means for simultaneously reciprocating the shoe and sieve frame in opposite directions, and means for adjusting either end of the sieve frame vertically in the shoe, said adjusting means being independent of the means for simultaneously reciprocating the shoe and the sieve frame.

In testimony whereof, I affix my signature, in the presence of two witnesses.

JOHN A. MALM.

Witnesses:
EMIL HOSTBJOR,
HOMER A. LEAVITT.

Copies of this patent may be obtained for five cents each, by addressing the "Commissioner of Patents, Washington, D. C."